(12) United States Patent
Suder et al.

(10) Patent No.: US 7,564,834 B1
(45) Date of Patent: Jul. 21, 2009

(54) SHARED KNOWLEDGE IN A TELEPHONE SYSTEM

(75) Inventors: Eric G. Suder, Plano, TX (US); Harold E. A. Hansen, II, Plano, TX (US)

(73) Assignee: Estoch System, Inc., Plano, TX (US)

(*) Notice: Subject to any disclaimer, the term of this patent is extended or adjusted under 35 U.S.C. 154(b) by 1445 days.

(21) Appl. No.: 10/283,804

(22) Filed: Oct. 30, 2002

Related U.S. Application Data

(63) Continuation-in-part of application No. 09/775,018, filed on Feb. 1, 2001, now Pat. No. 7,068,684.

(51) Int. Cl.
*H04L 12/66* (2006.01)
(52) U.S. Cl. .................. 370/352; 370/356; 370/401
(58) Field of Classification Search ......... 370/352–356, 370/401–402; 709/202–203, 206, 219, 223
See application file for complete search history.

(56) References Cited

U.S. PATENT DOCUMENTS

| | | | |
|---|---|---|---|
| 6,735,209 B1 * | 5/2004 | Cannon et al. | 370/401 |
| 6,839,341 B1 * | 1/2005 | Nakajima | 370/352 |
| 6,968,367 B1 * | 11/2005 | Vassar et al. | 709/202 |
| 7,139,263 B2 * | 11/2006 | Miller et al. | 370/352 |

* cited by examiner

*Primary Examiner*—Suhan Ni
(74) *Attorney, Agent, or Firm*—Fish & Richardson P.C.; Kelly Kordzik

(57) ABSTRACT

An information handling system comprises a IP network connecting a hub to a multimedia server and the hub to a data server, and the hub to an IP telephony device that is then coupled to a network device. When a telephone in one local area network within a wide area network has a change in its status, such as going off-hook, a status message will be sent to an associated extension within another local area network connected to the wide area network to thereby cause a status indicator to notify the user at the remote extension that the telephone in the first local area network has had a status change.

14 Claims, 13 Drawing Sheets

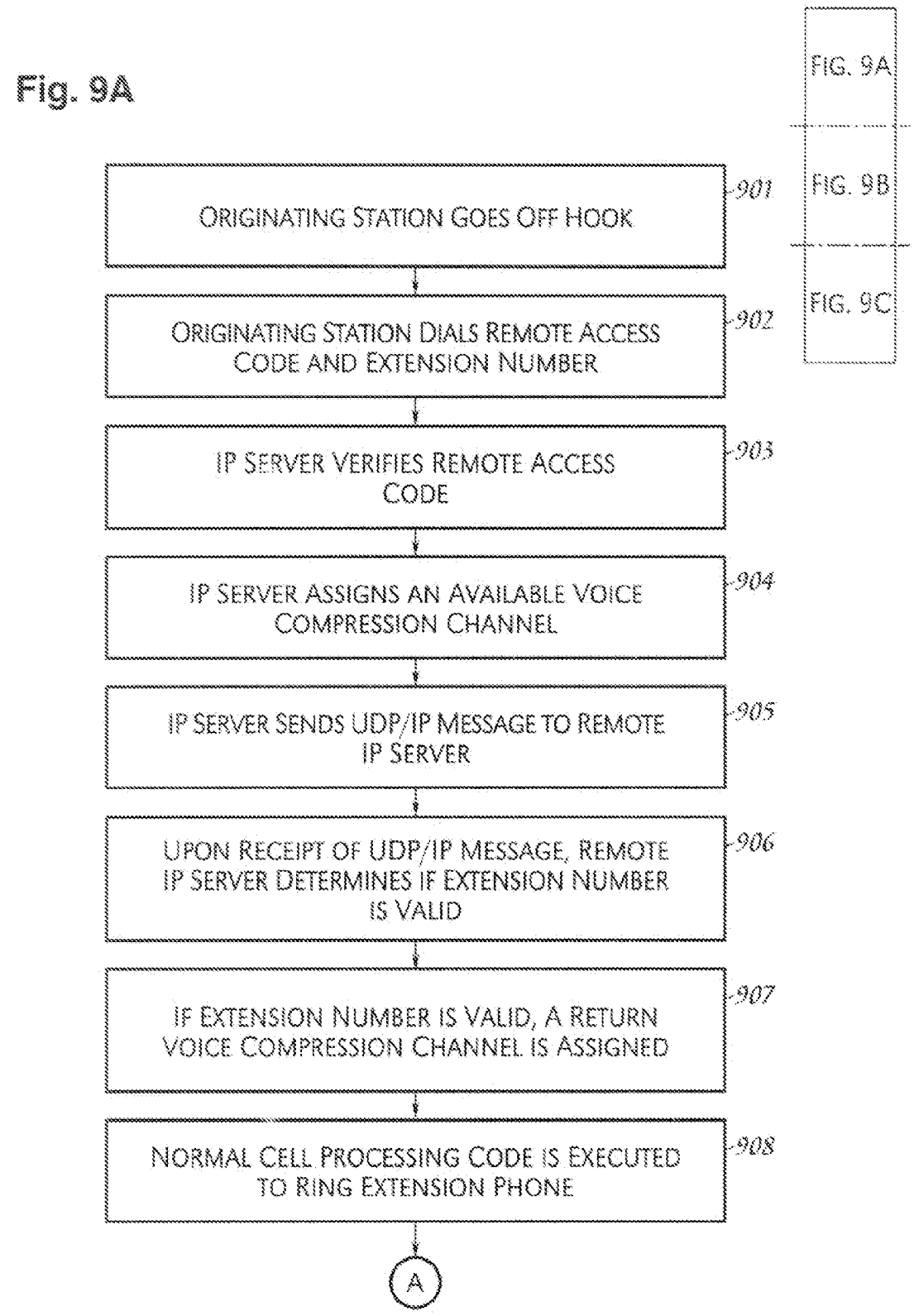

SHARED KNOWLEDGE IN A TELEPHONE SYSTEM

CROSS REFERENCE TO RELATED APPLICATIONS

This application for patent is a continuation-in-part application of U.S. patent application Ser. No. 09/775,018, filed Feb. 1, 2001, now U.S. Pat. No. 7,068,684 entitled "QUALITY OF SERVICE IN A VOICE OVER IP TELEPHONE SYSTEM."

This application for patent is related to the following patent applications:

Ser. No. 10/072,343; entitled "QUALITY OF SERVICE IN A REMOTE TELEPHONE";

Ser. No. 10/041,332; entitled "SERVICE OBSERVING IN A VOICE OVER IP TELEPHONE SYSTEM"; and Ser. No. 10/210,902; entitled "VOICE MAIL IN A VOICE OVER IP TELEPHONE SYSTEM"; which are all hereby incorporated by reference herein.

TECHNICAL FIELD

The present invention relates in general to information processing systems, and in particular, to the use of Voice over IP technology to transmit voice conversations.

BACKGROUND INFORMATION

Voice over IP ("VoIP") is a relatively recent development that is utilized to transmit voice conversations over a data network using the Internet Protocol ("IP"). Such a data network may be the Internet or a corporate intranet, or any IP network. There are several potential benefits for moving voice over a data network using IP. First, there is a savings in money compared to the need to use traditional tolled telecommunications networks. Additionally, Voice over IP enables the management of voice and data over a single network. And, with the use of IP phones, moves, adds and changes are easier and less expensive to implement. Moreover, additional and integrated new services, including integrated messaging, bandwidth on demand, voice e-mails, the development of "voice portals" on the Web, simplified setting up and tearing down, and transferring of phone calls are capable.

One of the advantages of Voice over IP is the ability to easily and inexpensively connect remote systems together. The concept of connecting multiple field office phone systems together is not new. Indeed, this is the primary purpose of the tie trunk. While the tie trunk approach eliminates the long distance phone charges between facilities, it is somewhat offset by the dedicated cost of the tie lines themselves. Tie-lines are dedicated to the task of connecting callers between phone systems and must be engineered to provide a worst-case traffic scenario. Even if there is a single call in progress, the other tie trunks sit idle and cannot be used for other purposes.

In addition to the high cost and inefficiencies of tie-lines, there is another major drawback: each phone system in the network is an independent entity, which does not share information. Even though the phone system may be a modern, sophisticated device with the ability to display the status of its local telephone sets, the user must dial the access code to the remote site, enter the desired extension number and listen for either a ring or a busy signal to determine the status of the called party.

Using Voice over IP technology, phone systems can communicate with each other over existing IP data networks typically present between remote offices. This feature alone can eliminate the need for expensive, dedicated circuits between facilities. The shared bandwidth can also be used for voice calls and data communication simultaneously; no bandwidth is dedicated to one or the other.

BRIEF DESCRIPTION OF THE DRAWINGS

For a more complete understanding of the present invention, and the advantages thereof, reference is now made to the following descriptions taken in conjunction with the accompanying drawings, in which:

FIGS. 9A, 9B and 9C illustrate a flow diagram of a station-to-station telephone call;

DETAILED DESCRIPTION

Figure 1:
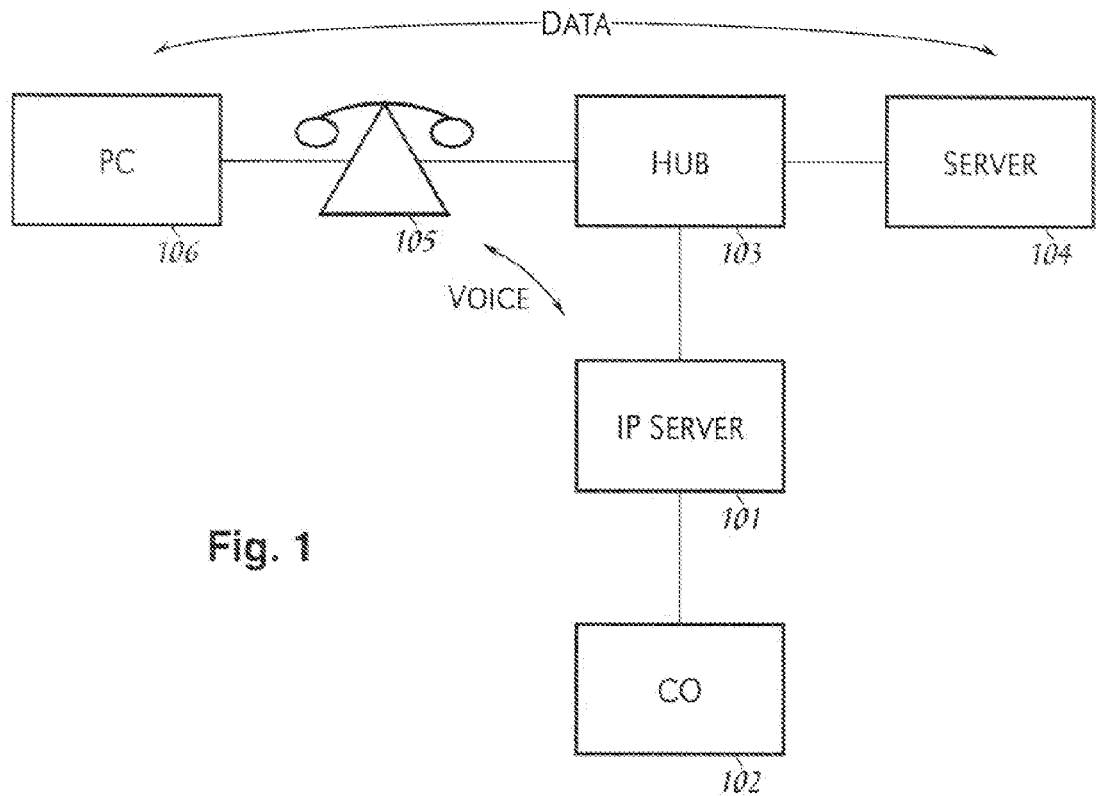
FIG. 1 illustrates an information processing system configured in accordance with the present invention.

In the following description, numerous specific details are set forth such as specific network configurations, network devices, types of multimedia traffic, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The IP telephone system of the present invention is designed to seamlessly connect other IP telephone systems together in a distributed network over a customer's data network. One application for this mode of operation is to connect branch offices together in such a way as to emulate a single large PBX phone system. One benefit includes eliminating long distance phone charges between offices and affording the user the benefits associated with a common phone system feature set.

FIG. 1 illustrates an information processing system configured in accordance with the present invention. FIG. 1 essentially illustrates a local area network ("LAN"), which in one configuration could be implemented with an Ethernet protocol. However, the present invention is not limited to use with any particular data transfer protocol. Workstation PC 106, network hub 103 and server 104 coupled to each other illustrate a typical LAN configuration where data is communicated between the workstation 106 and the server 104. Naturally, other workstations and servers could also be coupled to the LAN through hub 103, including the use of additional hubs. Hub 103 may be a 10Base-T or 10/100Base-T Ethernet hub. In an alternative embodiment, the hub 103 and server 104 may be implemented in the same data processing system. Herein, the term "workstation" can refer to any network device that can either receive data from a network, transmit data to a network, or both.

To add in the voice communication capabilities, an IP multimedia server 101 is coupled to hub 103 and an IP telephony device 105 is connected between the workstation 106 and the hub 103 (though the present invention should not be limited to such a configuration). The IP multimedia server 101 is coupled to a central office ("CO") 102 so that telephony device 105 can communicate to other telecommunications networks, such as the public switched telephone network ("PSTN"). Such a server could be any device having the switching/communication capabilities described herein, such as an IP PBX. Naturally, additional IP telephony device 105 can be coupled to hub 103, including having workstations coupled to hub 103 through such IP telephony devices. Further details on multimedia server 101 and IP telephony device 105 are described below. An IP telephone, or telephony device, is any apparatus, device, system, etc., that can communicate multimedia traffic using IP telephony technology. IP telephony is defined within *Newton's Telecom Dictionary*, Harry Newton, Seventeenth Edition, page 369, which is hereby incorporated by reference herein.

Information, or data, on the network includes both the voice and data information, and any other multimedia traffic. Traffic as a result of the data transmissions between workstation 106 and server 104 affects the bandwidth available for communications between telephony device 105 and multimedia server 101.

Figure 2:
FIG. 2 illustrates a wide area network configuration of the present invention.

FIG. 2 illustrates how the information processing system of the present invention as noted above with respect to FIG. 1 can be implemented across a wide area network ("WAN") 201 where the multimedia server 101 of FIG. 1 is coupled to another multimedia server 202 across LAN 201. Note that the other items described above in FIG. 1 have been omitted in FIG. 2 for the sake of simplicity.

Figure 3:
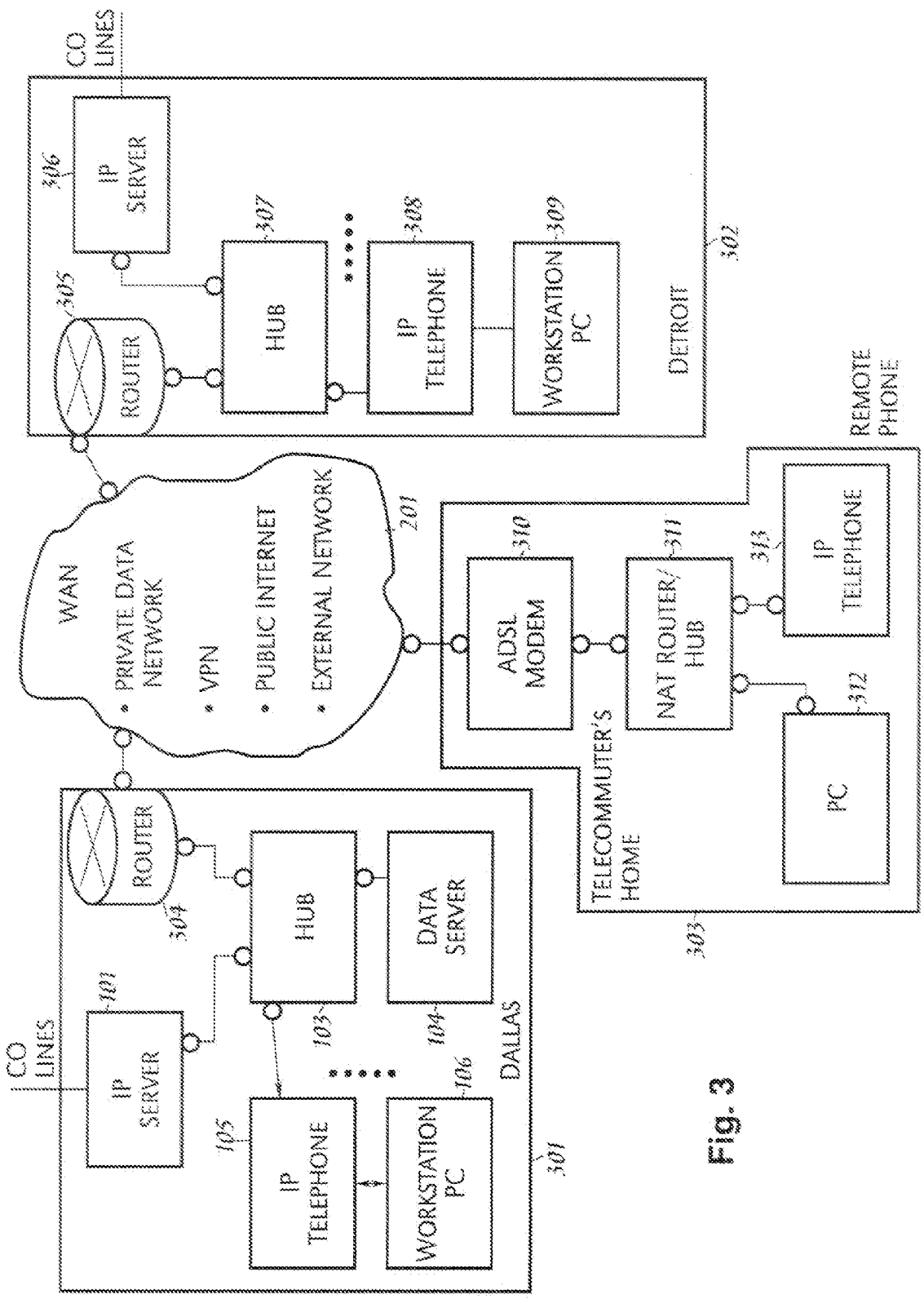
FIG. 3 illustrates another embodiment of a wide area network configuration of the present invention.

FIG. 3 illustrates further detail of a configuration of the present invention over a WAN 201. Note that such a WAN may implement the IP protocol, and could be a public WAN, such as the Internet, a private data network, an intranet, a Virtual Private Network ("VPN"), or any other external network.

FIG. 3 illustrates an exemplary system where WAN 201 couples an information processing system 301 in Dallas, Tex. to another information processing system 302 in Detroit, Mich., while also permitting a remote system 303 to couple to both systems 301 and 302 through WAN 201, such as from a telecommuter's home. System 301 is similar to the system described above with respect to FIG. 1. System 301 is coupled to WAN 201 through router 304. System 302 is similar to system 301 with the exception that a data server is not implemented within system 302. Router 305 is similar to router 304, multimedia server 306 is similar to multimedia server 101, hub 307 is similar to hub 103, IP telephony device 308 is similar to IP telephony device 105, and workstation 309 is similar to workstation 106.

Remote system 303 is coupled to WAN 201 using a modem 310, such as a cable modem, an ADSL (asymmetric digital subscriber line), modem or an equivalent. A NAT (Network Address Translation) router/hub 311 then couples a workstation PC 312 and an IP telephony device 313 to the modem 310. Not only can data be transferred across WAN 201 between systems 301-303, but also any one of telephony devices 105, 308 and 313 can communicate with each other and with the PSTN (not shown) over CO lines coupled to either of systems 301 and 302.

Figure 4:
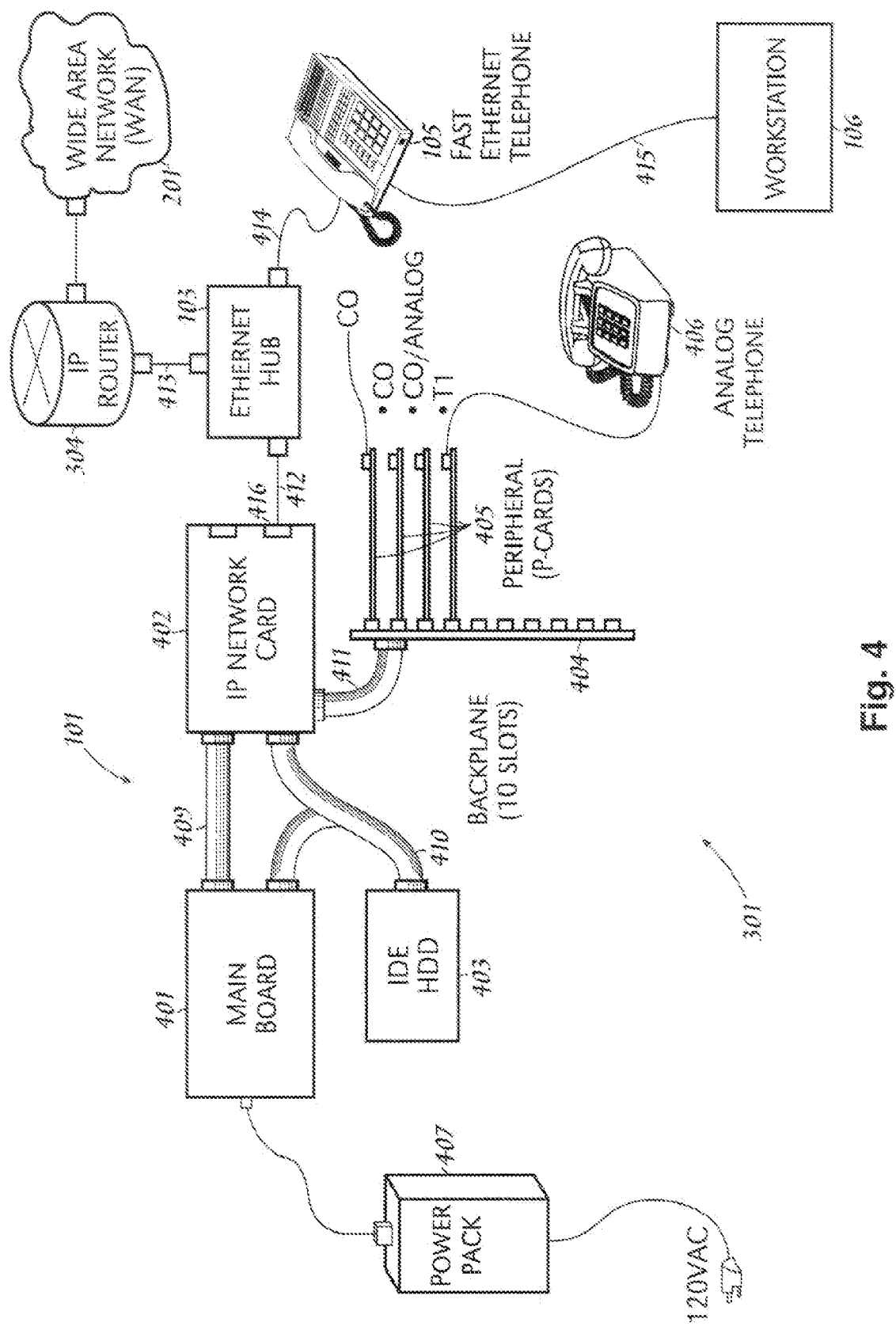
FIG. 4 illustrates a block diagram of a configuration of the present invention.

FIG. 4 illustrates further details of system 301. As noted above, system 301 is coupled to WAN 201 through IP router 304, which is coupled by line 413 to Ethernet hub 103. Ethernet hub 103 is connected by line 414 to fast Ethernet telephony device 105, which is coupled by line 415 to workstation 106. Ethernet hub 103 is coupled to IP network card 402 by connection 416, which may be a 10/100Base-T connector. Note that workstation 106 is optional.

Multimedia server 101 is comprised of main board 401, network card 402, hard drive 403, backplane 404 and peripheral cards 405. Network card 402 is further discussed below in more detail with respect to FIG. 5. Network card 402 is coupled by ribbon cable 409 to main board 401, which is further described below in more detail with respect to FIG. 6. Multimedia server 101 is powered through power pack 407. IDE (Integrated Drive Electronics) HDD (hard disk drive) 403 is coupled by ribbon cable 410 to network card 402 and main board 401, while network card 402 is coupled to backplane 404 through ribbon cable 411. Backplane 404 provides capacity for several peripheral cards (P-cards) 405, which are of a typical configuration for enabling a telephone system to connect to a central office (CO), T1 lines, analog central office trunks and analog telephones 406. Alternatively, ribbon cable 411 could be coupled to one of the peripheral cards 405 directly.

Figure 5:
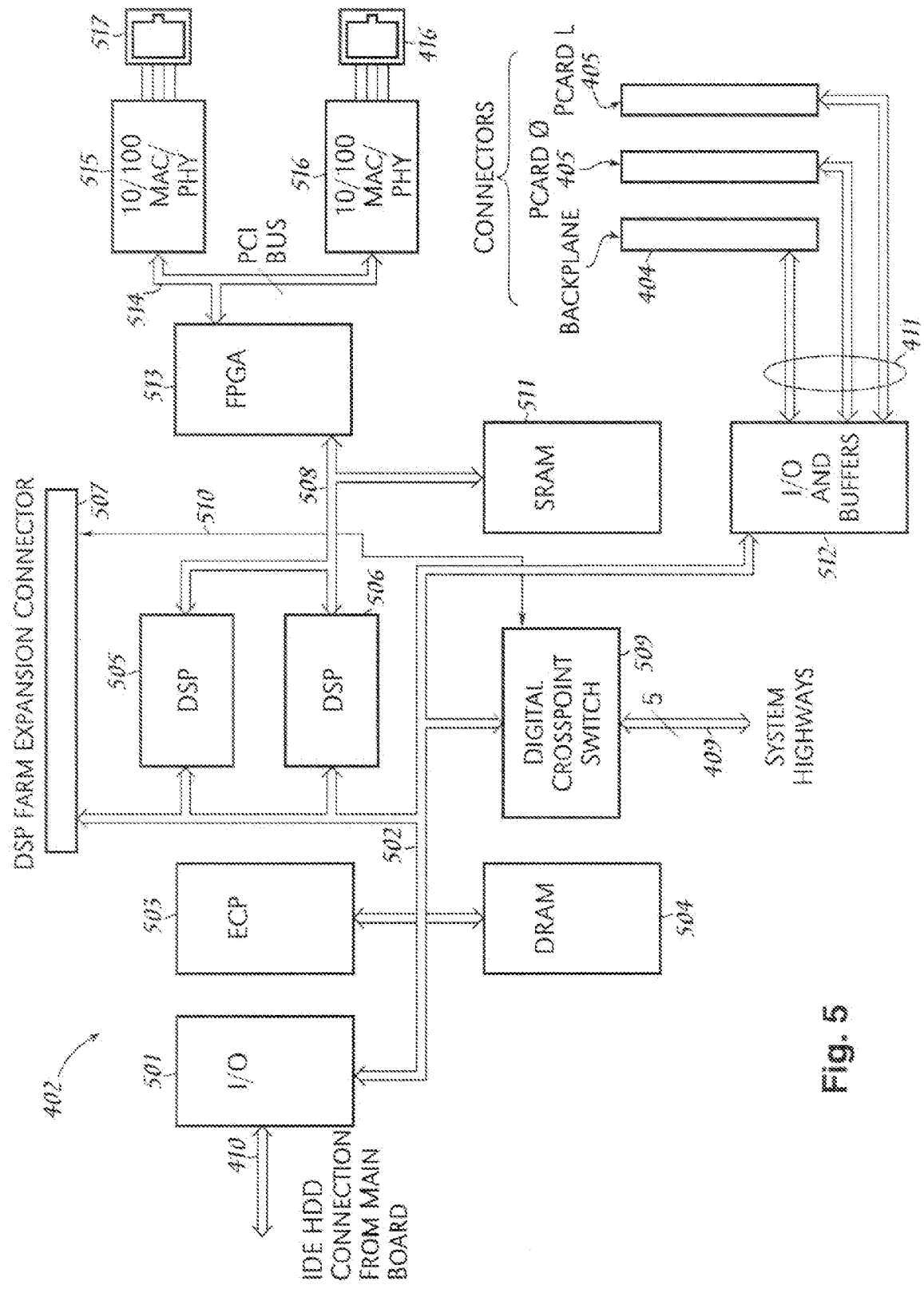
FIG. 5 illustrates a block diagram of a network card configured in accordance with the present invention.

Referring next to FIG. 5, there is illustrated a block diagram of network card 402. Network card 402 is responsible for communicating with all IP telephones, remote telephones and remote sites via a 10/100Base-T connection. The higher-level communication protocol used may be a standard UDP/IP (User Datagram Protocol/Internet Protocol) protocol, or an equivalent datagram or packet switched protocol. In addition, network card 402 communicates with the main board 401 for overall system control. Network card 402 has effectively replaced individual electronic key telephone circuits with a single Ethernet interface, and network card 402 now acts as the central distribution point for all peripheral cards 405, which can plug into backplane 404.

Ribbon cable 410 from hard drive 403 is received at I/O 501 coupled to bus 502. Bus 502 is coupled to ECP (Enhanced Call Processing) microcontroller 503, DRAM 504, DSPs 505 and 506, DSP farm expansion connector 507, digital crosspoint switch 509, and I/O and buffers 512. ECP 503 is a microcontroller responsible for overall communications between network card 402 and main board 401. ECP 503 directly interfaces the DSPs 505, 506 via the host port interface. The host port interface is a parallel (8 bit) interface between the DSPs and the host processor. This interface can be used to directly manipulate the DSP memory by a host processor. I/O 501 is a mailbox type parallel communication channel, which is multiplexed between communication with the IDE disk drive 403 and I/O 501 allowing direct control for functions such as firmware download and message passing. ECP 503 is based on a 16-bit Hitachi H8 family processor with built-in flash memory.

DSPs 505 and 506 can be implemented using Texas Instrument 5410 DSPs that perform packet encoding/decoding, jitter buffer management and UDP/IP protocol stacked functions. DSPs 505, 506 are connected to an external SRAM 511 and ASIC (FPGA) 513 that performs a PCI bridge function between bus 508 and bus 514, which is coupled to connectors 517 and 416 via 10/100 MAC/PHY devices 515 and 516. DSPs 505, 506 communicate with peripherals 405 via bus 502. DSP firmware is downloaded via the host port interface 501. I/O 501 allows communication with the main board 401 and the hard drive 403. Additionally, ECP 503 can directly control a daughter card containing additional DSPs through expansion connector 507 for functions such as speech compression.

Digital cross-point switch 509 is used to connect system voice conversations as needed between peripherals. Main board 401 houses the master cross-points with 616 discussed below with respect to FIG. 6. The peripheral cards 405 share a pool of 160 time slots. Cross-point switch 509 is primarily responsible for connecting the packet-switched voice connections of the IP telephones or remote systems to the circuit switchboard. The FPGA/PCI bridge 513 performs the functions required to connect the 10/100Base-T Ethernet MAC/PHY devices 515, 516. Since devices 515, 516 are designed to communicate via a standard PCI bus 514, the FPGA 513 implements a minimal PCI bus implementation. In addition, the FPGA 513 implements I/O latches and buffers as required.

The 10/100Base-T devices 515, 516 are stand-alone Ethernet devices, which perform the media access control ("MAC") and the PHYsical layer functions in a single, low-cost chip. Devices 515, 516 communicate to the host processor via a standard PCI bus 514, and communicate to the network via a pulse transformer coupled RJ-45 connection 517, 416. These devices contain FIFOs to minimize lost packets during traffic peaks. Per the PCI bus mastering specification, devices 515, 516 take control of the DSP bus and DMA data directly to SRAM 511. Conversely, the DSPs 505, 506 write data to be sent into the SRAM 511 and the devices 515, 516 DMA data via the PCI bus 514 to the network (LAN).

Figure 6:
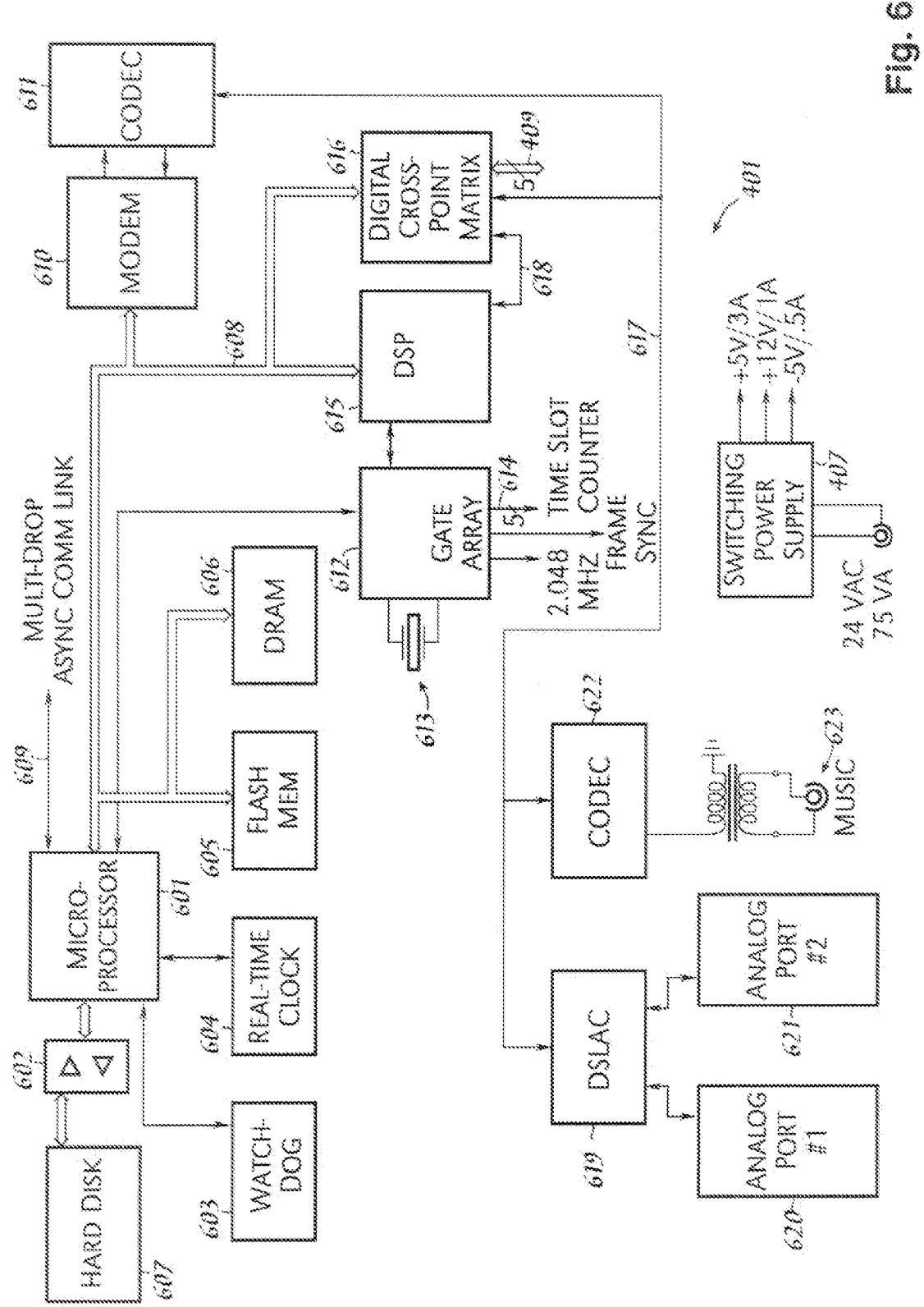
FIG. 6 illustrates a block diagram of the main board of the present invention.

Referring next to FIG. 6, there is illustrated, in block diagram form, main board 401 for integrating call processing and voice processing using a single processing means, which in this example is one microprocessor 601. Microprocessor 601, which may be a Motorola 68000 class microprocessor, communicates with hard disk 607 using driver circuitry 602. Hard disk 607 stores program data, voice prompts, voice mail messages, and all other types of speech used within main board 401. Microprocessor 601 also includes watchdog timer 603 and real-time clock source 604. Microprocessor 601 is coupled via bus 608 to flash memory 605 and dynamic random access memory ("DRAM") 606. Flash memory 605 is used to store bootstrap data for use during power up of main board 401. DRAM 606 stores the program accessed by microprocessor 601 during operation of main board 401. Bus 608 also couples microprocessor 601 to signal processing circuitry, which in this example is digital signal processor ("DSP") 615. Digital signal processor 615 implements a number of functions traditionally implemented by discrete analog components.

Figure 7:
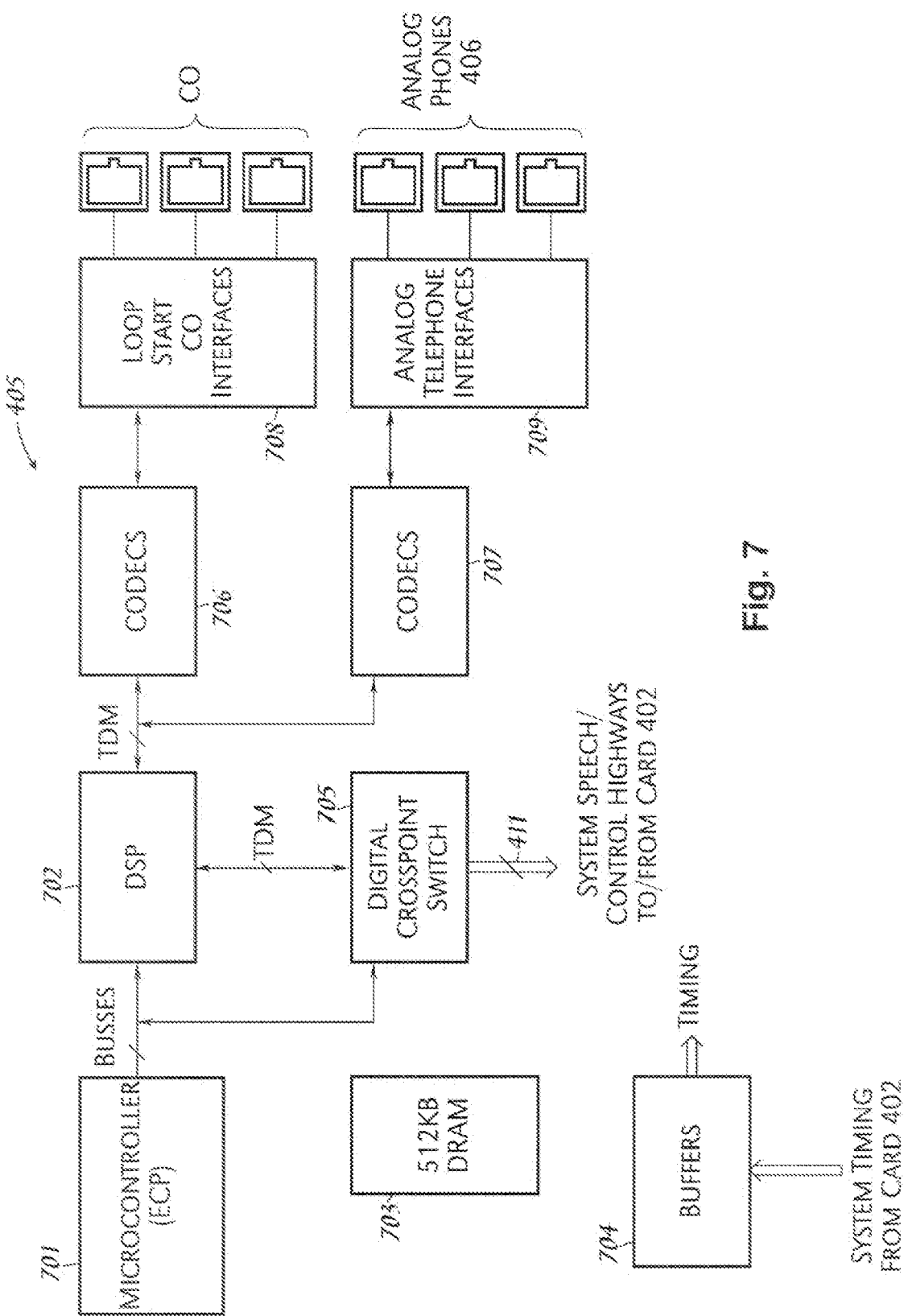
FIG. 7 illustrates a block diagram of a peripheral card configured in accordance with the present invention.

Referring next to FIG. 7, there are illustrated some of the primary functions implemented in DSP 615. DTMF receivers 1301 are implemented using frequency domain filtering techniques. DTMF receivers 1301 detect all 16 standard DTMF (touch-tone) digits. Automatic gain control ("AGC") 1302 is a closed-loop gain control system which normalizes received audio levels during recording. Recording buffers 1303, which are coupled to AGC 1302, receive and store speech samples after they have passed through AGC block 1302. These speech samples are converted to µ-law PCM (Pulse Code Modulation) and double buffered (several samples per buffer). Microprocessor 601 copies the record data out of DSP buffers 1303 into RAM buffers (not shown), which are located in the microprocessor 601 data RAM area. Fax tone detector 1304 is implemented using frequency domain filtering techniques. Fax tone detector 1304 detects the standard 1100 Hz FAX CNG tone (also referred to as the Calling Tone). Caller ID modems 1305 are 1200 baud FSK modems similar to Bell 202-type modems. Caller ID modems 1305 are implemented as a frequency discriminator where a time delayed (quadrature) signal is multiplied by the original signal, low pass filtered, then sliced, which produce the square wave caller ID data stream. Call processing tone generators 1307 are free running oscillators which generate the appropriate tones (and tone pairs) which make up the industry standard call processing tones. These tones include:

dial tone
busy/reorder tone
ring back tone
single frequency (440 Hz) tone
DTMF dialer tones Play buffers 1308 replay data from hard disk 607 through microprocessor 601 and place this play data in buffers 1308. This data is converted from an 8-bit µ-law PCM signal to 14-bit linear data. Conference bridges 1306 allow multiple conference bridges to mix together conferees into a multi-party conference. These conferees may be a mixture of inside and outside parties. A combination of "loudest speaker" and "summing" is utilized.

DSP 615 communicates with microprocessor 601 via a host interface port ("HIP") via bus 608. The HIP link supports a command-based protocol, which is used to directly read or write DSP memory locations. DSP 615 is a RAM-based part and has its program downloaded from microprocessor 601. Once downloaded and running, microprocessor 601 (the host) polls for events or receives interrupts indicating that data is available. DSP 615 speech connections are made over an industry standard 32-time slot, 2.048 megabits per second (Mb/s) digital serial link 618. Link 618 occupies one of the digital highways implemented by digital cross-point matrix 616. Each service of DSP 615 occupies a single time slot. For example, DTMF receiver 1 occupies time slot 0 while conference bridge circuit 12 occupies time slot 31.

Digital cross-point matrix 616 is also coupled to bus 608 and operates to connect any voice path to any other voice path. Digital cross-point matrix 616 is a VLSI (Very Large Scale Integration) integrated circuit. An example of digital cross-point matrix 616 is manufactured by MITEL Semiconductor Corporation as part No. 8980. Digital cross-point matrix 616 communicates with microprocessor 601 via a memory mapped input/output (I/O) scheme. A command/control protocol is used for communication between microprocessor 601 and digital cross-point matrix 616 via bus 608. Cross-point matrix 616 is coupled by highway 618 to DSP 615. Cross-point matrix 616 is coupled to highway 617. Digital cross-point matrix 616 is capable of making 256 simultaneous fully non-blocking connections. However, it may be upgraded by adding additional DSPs and/or cross-point matrices.

Gate array 612 is an SRAM (Static Random Access Memory) based device. An example of gate array 612 is manufactured by XILINX. Gate array 612 is responsible for generating all system timing. A master clock signal is provided by microprocessor 601 at 16.384 MHz. This clock signal is divided down to provide a number of phase coherent system clocks such as 4.096 MHz, 2.048 MHz and 8 KHz (frame sync). In addition, a 5-bit time slot counter is implemented which allows all the system CODECs to detect the appropriate time slot to use (0-31). An additional divider chain is included to divide the system clock down to 20 Hz, which is used by the ringing generator power supply (not shown). Gate array 612 is downloaded at boot-up by system software. Gate array 612 is based on an SRAM architecture. That is, the internal fusible links commonly found in programmable logic are actually stored in volatile SRAM. Because of this architecture, gate array 612 is downloaded after power-up. Also, note the added flexibility of being able to modify the logic by simply loading new system software. Because the device is SRAM-based, it loses its programming when power is removed.

Bus 608 is also coupled to modem 610, which provides a capability of calling into system 401 on a remote basis to load additional programs, voice prompts, etc., or updates thereto, into hard disk 607. Modem 610 is coupled to coder/decoder ("CODEC") 611, which is coupled to highway 617. This connection allows coupling of modem 610 through crosspoint matrix 616 to CO lines through bus 409 to the p-cards described with respect to FIG. 5.

Also coupled to highway 617 is dual subscriber line access chip (DSLAC) 619, which is well-known in the art, and which is coupled to analog ports 620 and 621, which provide an ability for system 401 to communicate to analog-type connections such as cordless telephones and fax machines.

Highway 617 is also coupled to CODEC 622, which is coupled to transformer 623 to a music source, which provides an ability to couple an external music source to a caller through cross-point matrix 616 for such things as providing the caller with music on hold.

Power to system 401 is provided through switching power supply 407, which converts AC to the various DC supply voltages needed by circuitry within system 401.

Referring next to FIG. 7, there is illustrated peripheral-card ("p-card") 405, which is coupled to main board 401. Main board 401 communicates with p-card 405 via system speech/control highways 411. This connection 411 is made to microcontroller 701 via digital crosspoint switch 705. P-card 405 provides interconnections between CO lines and analog phone lines to network card 402. Microcontroller 701 controls all the real-time functions associated with p-card 405. When p-card 405 is plugged into backplane 404, a card address is assigned to p-card 405. This card address is read by microcontroller 701 and is used to filter commands over communication link 411. When network card software wants to communicate with the specific p-card 405, the address is sent in the message packet which all p-cards 405 receive. P-cards 405 match the address in the message to the hardwired address on the ribbon cable 411. If a match is made, only that p-card 405 responds to the command set. Microcontroller 701 contains an internal program memory (not shown) and is connected to an external DRAM 703. The internal program memory contains a bootstrap program which upon reset or power-up, requests a fresh firmware load from network card 402. This firmware load is transferred to DRAM 703. Upon download completion, the program is run from within DRAM 703. This scheme allows for microcontroller 701 firmware to be updated and loaded at any time. Network card 402 sources all system timing through buffers 704. Timing signals to p-card 405 consists of a 2.048 MHz clock signal, an 8 KHz frame sync, which signifies the first time slot of a 32 time slot highway, and 5 time slot counter bits, which represent a binary count from 0 to 31. As mentioned above, p-card 405 is assigned a card slot address when it is connected to network card 402. This card slot address is used to calculate which time slots p-card 405 should be using. The time slots used for the CO codecs 706 and analog phone codecs 707 are generated by buffers 704. The loop start central office (CO) lines are supplied by the local telephone company and consist of a wet balanced differential audio pair. The term "wet" refers to the fact that a voltage of −48 volts is present on the pair. The system requests dial tone from the CO by providing a nominal 200 ohm loop across the TIP and RING conductors and releases the connection by opening the loop. The CO rings the system by placing a 90 vrms AC, 20 Hz sine wave on the TIP and RING conductors. The system seizes the line by going off hook.

Interfaces 708 incorporate a circuit that monitors the voltage present across TIP and RING of each CO. This line voltage monitor circuit serves to detect the ring voltage present during ringing (ring detection) and the unique feature of monitoring the CO line status for conditions such as whether the CO is plugged in or if someone is off hook in front of the system. The latter can be used to detect theft of service or allow a credit card verification terminal to be used without interfering with normal system operation. The voltage monitor circuit consists of a balanced differential op-amp connected across TIP and RING of the CO lines through a very high impedance (>10M ohms). The output of the four voltage monitor op-amps are fed to an analog-to-digital converter with a built-in analog multiplexer (not shown). Microcontroller 701 firmware monitors the line voltages. There is also a balanced differential AC coupled op amp across the CO TIP and RING to monitor the low level audio tones present during caller ID. The output of these op-amps are selected via an analog switch during the idle period and are connected to the CO line codec 706. To correctly terminate the CO line (seizure) care must be taken to satisfy the DC loop requirements (~200 ohms) and the AC impedance requirements (~600 ohms). The classic approach has been to terminate TIP and RING with an inductor (called a holding coil) which has a large inductance (>1 Hy) and a DC resistance of ~200 ohms. The inductor separates the AC and DC components to give the desired effect. The problem is that the inductor must be large enough not to saturate with currents as high as 100 milliamps. An inductor which satisfies these requirements is physically cumbersome.

P-card 405 incorporates a solid state inductor circuit called a gyrator (not shown) to implement the holding coil function. This single transistor emulates an inductor with the above requirements while taking up very little PCB space. A small solid state relay (not shown) is used as the hook switch. When energized, the gyrator holding coil is placed across TIP and RING closing the loop. The audio present on TIP and RING is AC coupled to a small dry transformer. The secondary of this transformer is connected to the AC termination impedance and to the codec 708, which may be implemented on a dual subscriber line access chip ("DSLAC"). High voltage protection is provided for all paths on the TIP and RING connections. These paths include TIP to RING, TIP to GROUND, RING to GROUND, and TIP and RING to GROUND. This high voltage protection is accomplished by first passing the TIP and RING conductors through positive temperature coefficient varistors (not shown). These varistors act as resettable fuses. When excessive current flows through these varistors, they become resistive thus limiting the current flow. When the excessive current is stopped, the original resistance is restored.

Figure 8:
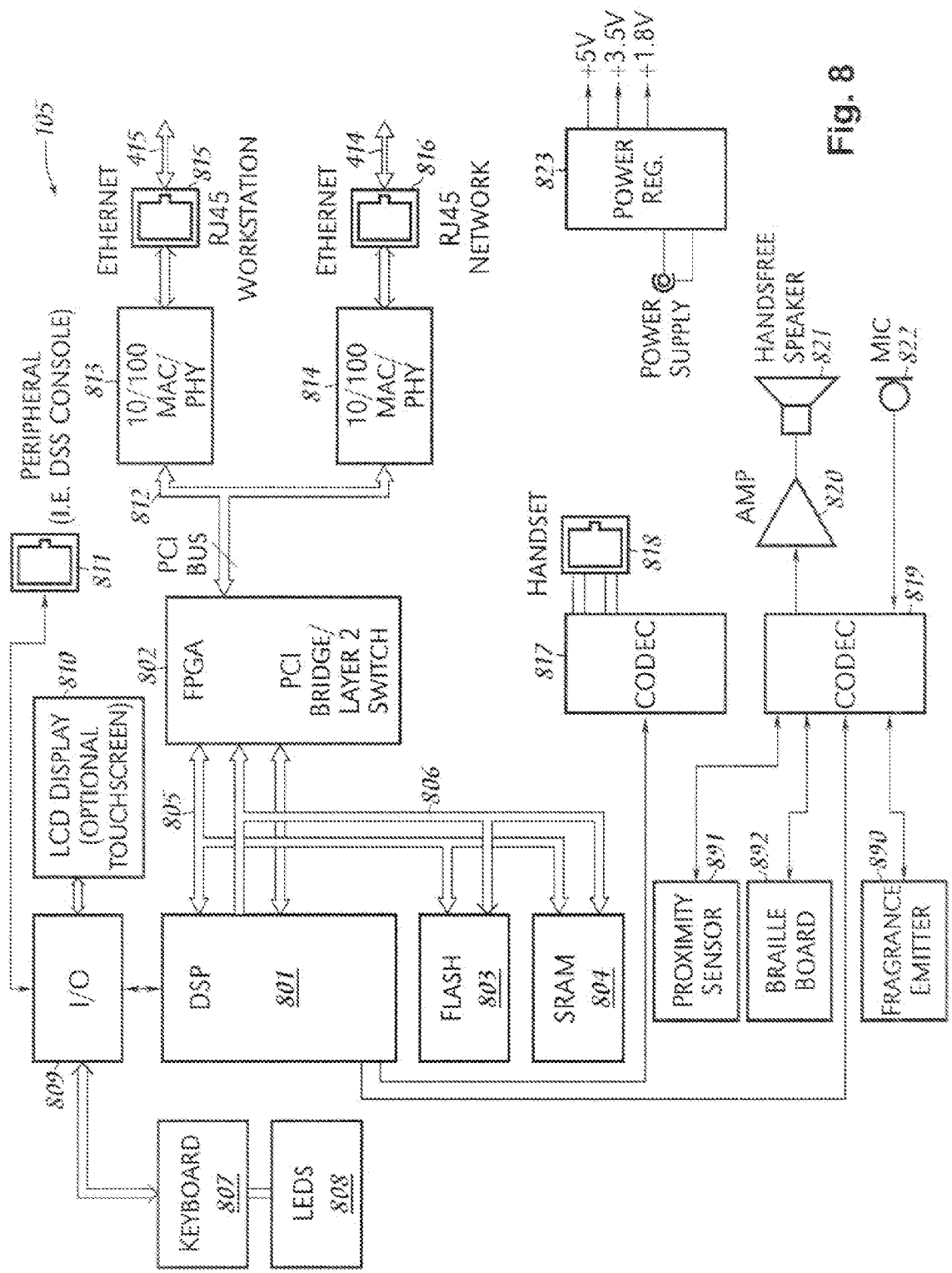
FIG. 8 illustrates a block diagram of a telephony device configured in accordance with the present invention.
Figure 9B:
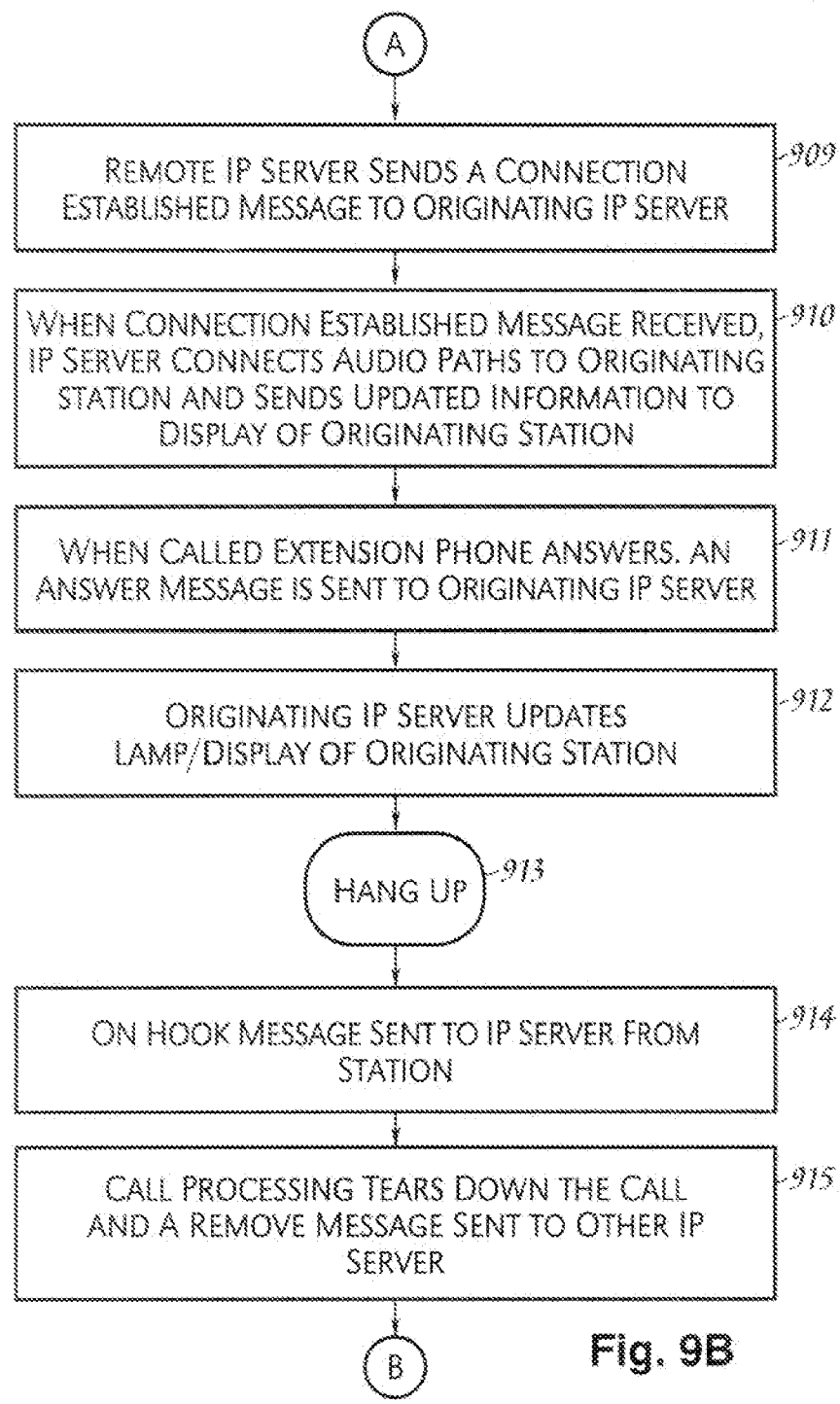
Figure 9C:
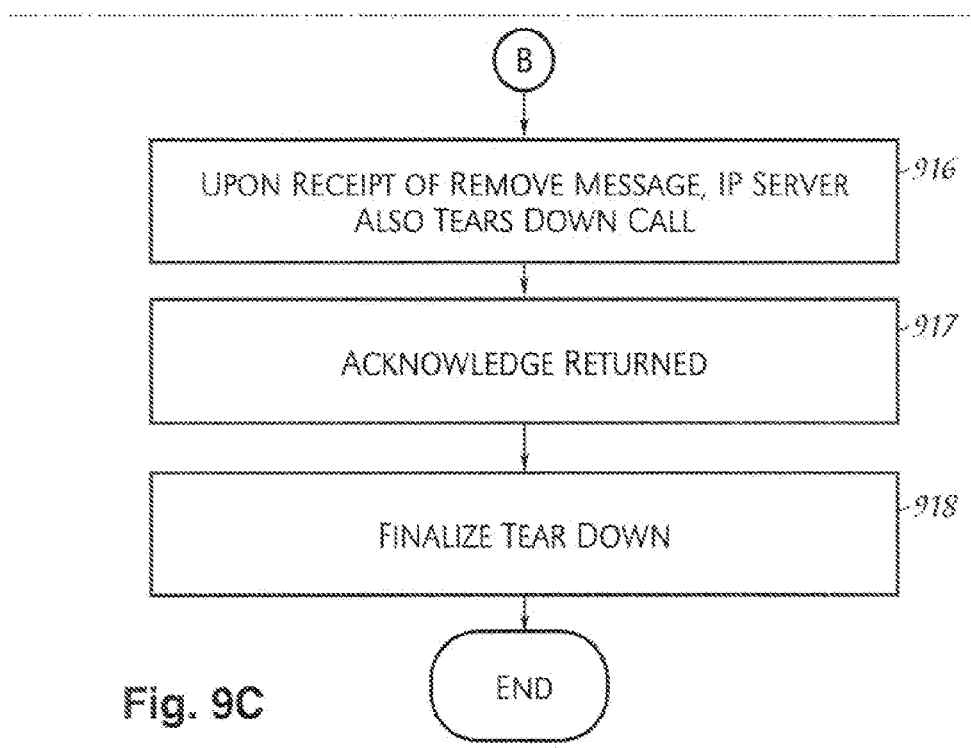

Referring to FIG. 8, there is illustrated a block diagram of further detail of IP telephony device 105. IP telephony device 105 may be a DSP based telephone instrument. Telephony device 105 communicates with the multimedia server 101 via the UDP/IP Protocol. PHYsical connection to the LAN is via an Ethernet 10/100Base-T interface. IP telephony device 105 contains the ability to perform layer-2 switching between two Ethernet ports in the telephony device for total control over voice versus data quality of service in accordance with the present invention. Speech samples are digitized, stored in 16 millisecond long packets and transmitted to the multimedia server 101 via the UDP/IP Protocol. As packets are received, they are triple-buffered to compensate for jitter before playback. Connection 415 from workstation 106 is received by Ethernet RJ-45 connector 815, which is coupled to MAC/PHY device 813. Connection 414 between hub 103 and telephony device 105 is connected to RJ-45 connector 816 which is coupled to MAC/PHY device 814. Devices 813 and 814 are coupled by PCI bus 812 to FPGA/PCI bridge 802. DSP 801 may be a Texas Instruments Model 5402 DSP, DSP 801 can be the only processor implemented within telephony device 105. DSP 801 performs typical DSP audio algorithms such as tone generation, gain, speaker phone algorithms, and energy detection. In addition, DSP 801 acts as a standard control processor performing such tasks as scanning the keyboard 807, lighting LED lamps 808, displaying LCD messages on LCD 810, performing UDP/IP stack functions, and communicating with devices 813, 814 via the PCI bus 812. Note that DSP 801 communicates with keyboard 807, LEDs 808, LCD display 810, and peripheral connection 811 by I/O device 809 in a typical manner. Peripheral connection 811 permits a coupling of DSP 801 to a DSS (Direct Station Select) console. A DSS console is a stand-alone device, which connects to the IP telephony device 105 to provide 64 individual LED lamps and keys. The lamps can be programmed by the user to monitor the status of individual stations (extensions), trunks or features. Pressing the key will access the associated function. Each telephony device in the system can connect to a DSS console. However, keyboard 807 may also include such DSS lamps (buttons). The DSS console communicates with the IP telephony device 105 via a 9600 baud serial communication link. The IP telephony device 105 does not contain a serial UART device, so the serial data protocol is controlled by software running in DSP 801. Physical connection between the telephony device and DSS console may be via a standard two pair modular line cord. DSP 801 is coupled to an external FLASH memory 803 and a fast SRAM 804, and FPGA 802 via buses 805 and 806.

CODEC 817 and CODEC 819 perform analog to digital and digital to analog conversion of signals. CODEC 817 is connected to the handsets, speaker and microphone elements (not shown) via connector 818, while CODEC 819 is connected to the hands-free speaker 821 through amplifier 820, and to the hands-free microphone 822. CODEC 819 may also be connected to a braille board 892 that permits a sight-impaired person to interact with the system. Additionally, a fragrance emitter 890 that simulates smells may be used to notify with a certain smell in response to predetermined events. Further, a proximity sensor (e.g., motion detector, IR sensor) 891 may be coupled to CODEC 819 to signal when a user is in proximity to phone 105. Separating the functionality in this way permits the IP telephony device 105 to send tones or voice to one speaker while allowing a normal conversation over the other. FPGA/PCI bridge 802 performs the functions required to connect telephone 105 to the 10/100Base-T Ethernet devices 813, 814. Since devices 813, 814 are designed to communicate via a standard PCI bus 812, the FPGA 802 implements a minimal PCI bus implementation. In addition, the FPGA 802 implements I/O latches and buffers as required.

Devices 813, 814 perform the Media Access Control and the PHYsical layer functions. Devices 813, 814 communicate to DSP 801 via a standard PCI bus 812, and communicate to the LAN via post-transformer coupled RJ-45 connections 815, 816. Devices 813, 814 can contain FIFOs to minimize lost packets during traffic peaks. Per the PCI bus mastering specification, devices 813, 814 take control of the buses 805, 806 and direct memory access (DMA) data directly to SRAM 804. Conversely, DSP 801 writes data to be sent into the SRAM 804 and the devices 813, 814 DMA the data via the PCI bus 812 to the LAN.

Referring to FIGS. 3, 9A, 9B, and 9C, there is described a station-to-station call to a remote site. In step 901, a user 105 in Dallas 301 lifts the handset (i.e., goes off hook) to place a call to user 308 in Detroit 302. This off book event is directed to call processing, where system software prepares to collect dial digits. As noted above, call processing is performed in main board 401 in IP server 101. Call processing in turn updates any lamp/display information on IP telephone 105, indicating that the telephone 105 has gone off hook. In step 902, user 105 dials an access code associated with site 302. These codes may, for example, be three digits long and in the range 700-799. In this example, the code is "702." User 105 then dials the extension number (e.g., "106") of user 308. IP server 101 first validates the existence of the remote system (i.e., verifies that "701" exists) then assigns one of the available voice compression channels (steps 903 and 904). Next, in step 905, once the voice compression channel is assigned, a message is sent via UDP/IP from IP server 101 to IP Server 306 via routers 304 and 305 in network 201, indicating the desire to establish a connection between the systems. The message carries with it the voice channel assigned, the originating extension (e.g., IP telephone 105), name/number and the extension number, of the desired terminating station (e.g., IP telephone 308, extension number "106"). In step 906, once IP server 306 receives the message, it first checks to see if the called extension number (e.g., "106") is valid. If so, in step 907, a return voice compression channel is assigned, and the normal call processing code is executed to start ringing the IP telephone 308 (step 908). In step 909, a message is then sent from call processing to the IP telephone 308, causing the telephone 308 to begin ringing. In step 909, when the above tasks have been completed, IP server 306 sends a connection establish message back to IP server 101, indicating the connection has been made. In step 910, when IP server 101 receives the connection establish message, it connects the audio paths and updates the lamp/display on IP telephone 105 via an update message. In step 911, when a user answers the ringing telephone 308, an off hook message is sent from telephone 308 to IP server 306. When call processing running within IP server 306 receives this message, an answer message is sent back to IP server 101 along with the name of the called party (used for display on IP telephone 105). IP server 101 then updates the lamp/display of IP telephone 105 with the update message. After some period of time, the originator hangs up (913). In step 914, this action causes an on hook message to be sent from IP telephone 105 to IP server 101. In step 915, call processing within IP server 101 then tears down the call in server 101, and a remove message is sent to IP server 306. In step 916, once this message is received by IP server 306, it forces call processing in server 306 to tear down the call, which, in turn, causes a lamp/display update message to be sent to IP telephone 308. In step 917, IP server 306 responds with an ACK (acknowledge) to the remove message. In step 918, once the ACK is received by IP server 101, its call processing finalizes the tear down process and sends a lamp/display update message to IP telephone 105 and returns to an idle state. Note that the process of one of the telephones going on hook in the following tear down process can be originated by IP telephone 308. If the called party 308 does not answer, the call is handled by the normal call processing routines to re-route the call (in this case, the call is rerouted to voice mail).

Figure 10:
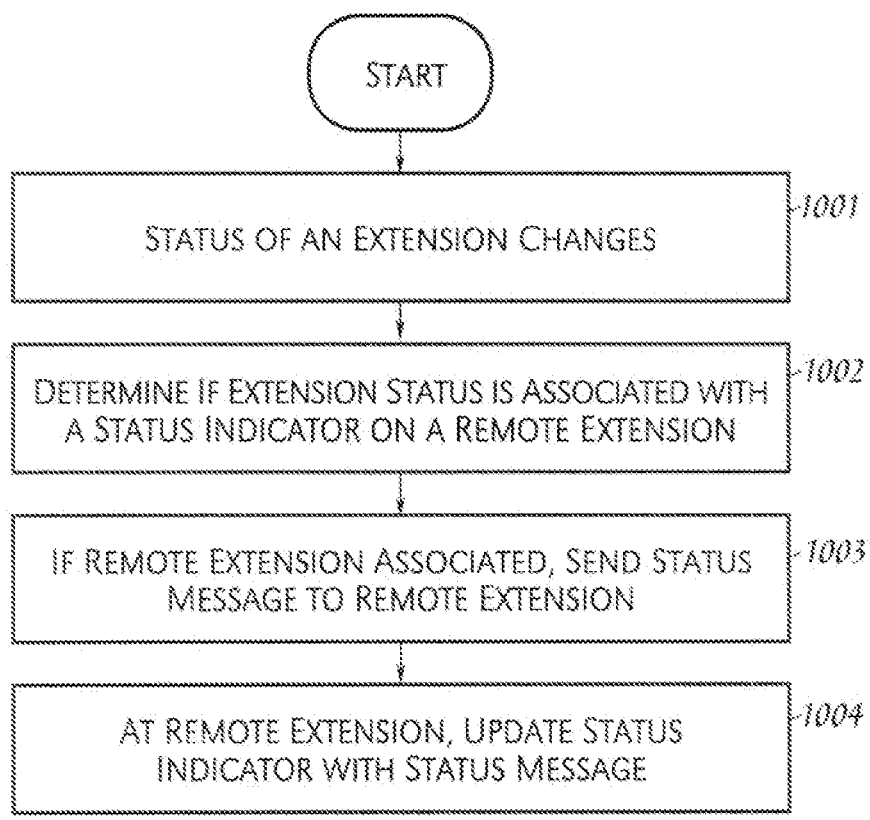
FIG. 10 illustrates a flow diagram of shared knowledge.
Figure 11:
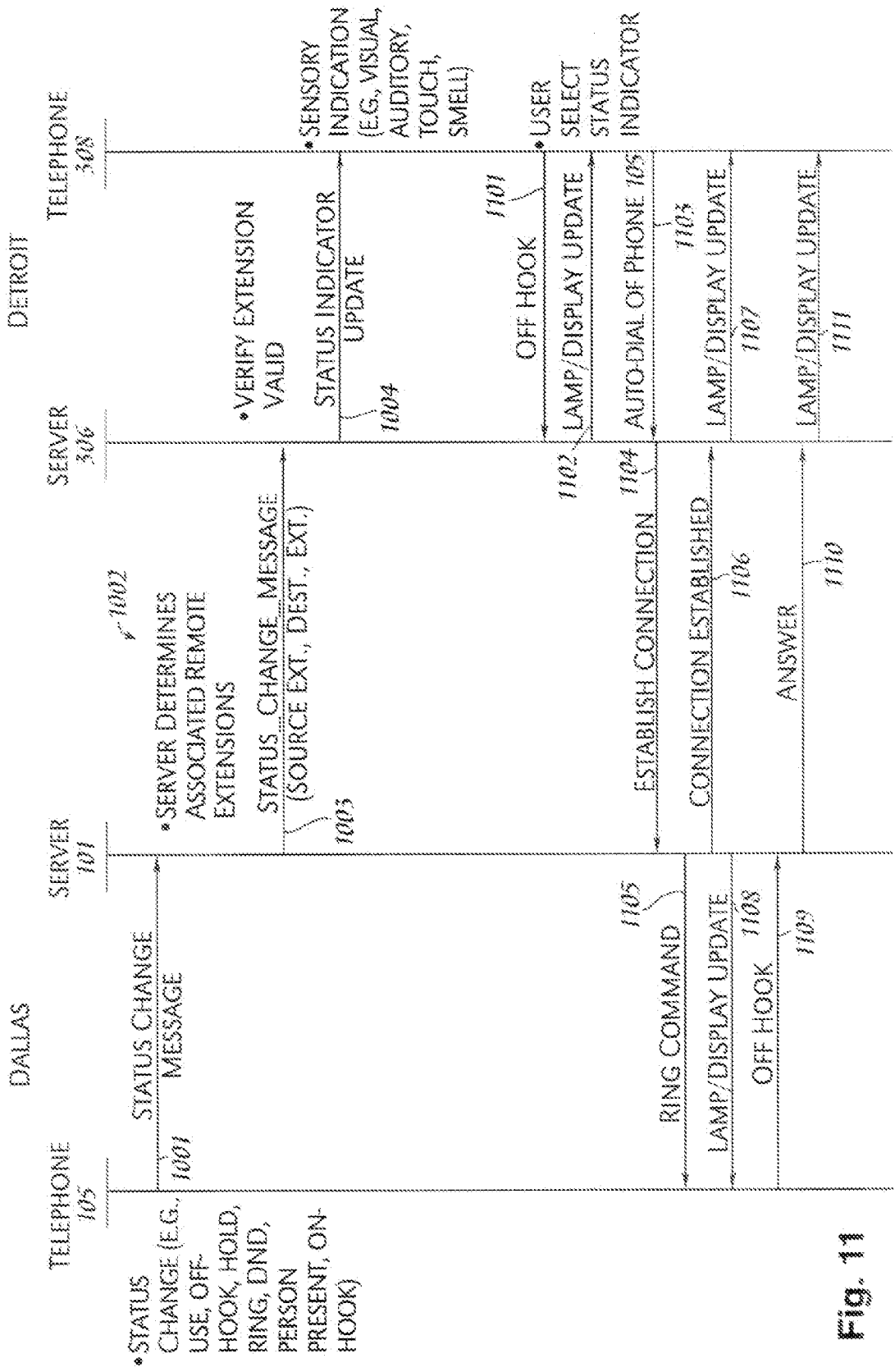
FIG. 11 illustrates a flow diagram of a DSS call over an IP network.
Figure 12:
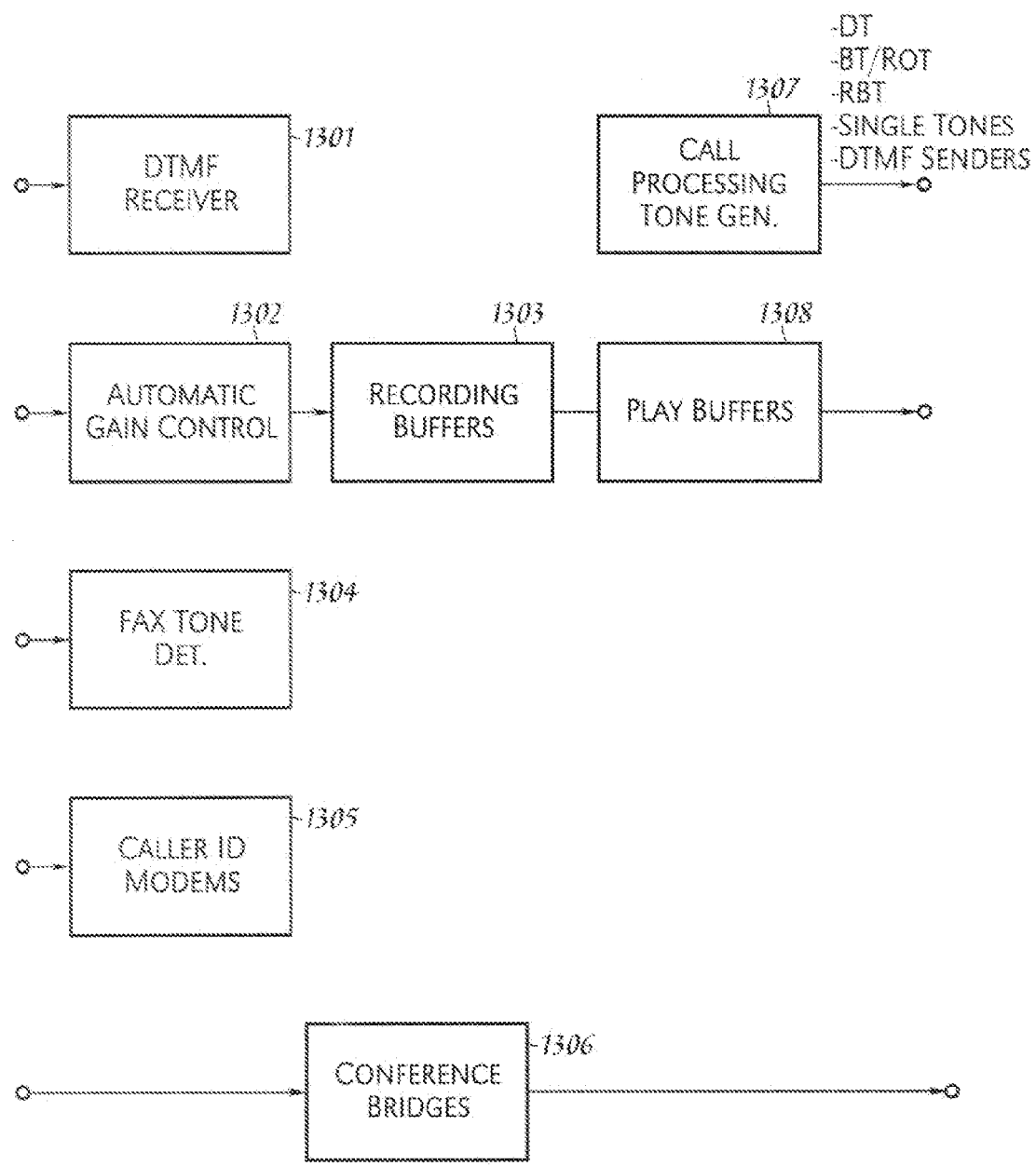
FIG. 12 illustrates functions implemented in the processing means of the main board.

Referring to FIGS. 10 and 11, there is illustrated a process for the sharing of knowledge or information between telecommunications devices in the WAN 201 shown in FIG. 3. In step 1001, a status change in telephone 105 occurs. For example, telephone 105 may be in use by a user; telephone 105 may be in an off-hook state; telephone 105 may be in an on hold state; telephone 105 may be ringing because of an incoming call; telephone 105 may be in a do not disturb (DND) state; telephone 105 may be in an on-hook state; or, with a proximity sensor 891 coupled to telephone 105, a status indication may be that a person is presently in proximity to telephone 105. Any one of these states may be monitored and create a signal when such a status changes for telephone 105. When that occurs, software will determine if the extension status of telephone 105 is to be associated with a status indicator on a remote extension within the network. A status change message 1001 is sent to the server 101 which determines if there are any associated remote extensions in step 1002. If so, then a status_change_message is sent to the server associated with the identified remote extension in step 1003. Such a message will also include an identification of the source extension 105 and the destination extension 308. At server 306, when the status_change_message is received, server 306 will verify the extension 308 is a valid extension within that LAN 302. If so, then in step 1004, a status indicator update signal is sent from server 306 to telephone 308, which results in an update of a status or sensory indicator associated with telephone 308. Such a sensory indication may be visual, such as the illumination of a DSS key 808, or a message on a LCD display 810. Such a sensory indication could also be auditory with some type of tone or even a simulated voice signal. If a braille board 892 is connected to telephone 308, some type of touch sensory indicator could be used to inform the user of the change of the status. Even a fragrance simulator emitter 890 could be utilized to emit a certain smell or fragrance. Such fragrance emitters are well known in the art.

Thereafter, the user at telephone 308 could optionally attempt to then call the user at telephone 105. For example, if the user at telephone 308 wants to contact the user at telephone 105, but does not wish to merely leave messages if the user at telephone 105 is either not present in their office or is on another call, the user at telephone 308 can wait for a status indication change on telephone 308 that the user at telephone 105 is now available to receive a call. In that case, the user may select the status indicator, such as pressing a DSS key on telephone 308. Alternatively, the user may just dial the extension of telephone 105. This is performed first by going off-hook with telephone 308 in step 1101. In step 1102, a lamp or display is updated on telephone 308 that the telephone is now in an off-hook state. Thereafter, in step 1103, telephone 308 will automatically dial telephone 105 in response to the user selecting the status indicator (e.g., pressing the DSS key). Server 306 will receive this message from telephone 308, and in step 1104 will attempt to establish a connection by sending a message to server 101. If server 101 determines that telephone 105 is a valid extension, it will send a ring command message 1105 to telephone 105. A connection establish message 1106 will then be returned from server 101 to server 306, which will update telephone 308 with a lamp/display update message 1107. Additionally, a lamp/display update message 1108 is sent from server 101 to telephone 105 that it is now connected to telephone 308. When the user at telephone 105 goes off-hook in step 1109 to answer the call, an answer message 1110 will be sent from server 101 to server 306, which results in a lamp/display update message 1111 sent to telephone 308 that the user at telephone 105 has answered their telephone. After the call has been completed by the parties, a tear down process may be used to tear down the call.

Although the present invention and its advantages have been described in detail, it should be understood that various changes, substitutions and alterations can be made herein without departing from the spirit and scope of the invention as defined by the appended claims.

What is claimed is:

1. A telephone system comprising:
   a first telephone connected to a first server in a first local area network ("LAN");
   a second telephone connected to a second server in a second LAN;
   a wide area network ("WAN") coupling the first LAN to the second LAN;
   the first server having circuitry for sending a status change message to the second server via the WAN, the status change message containing information that the first telephone has changed from a first state to a second state, wherein the status change message is not associated with an establishment or termination of a voice communication channel between the first and second telephones;
   the second server having circuitry for sending a signal to the second telephone in response to receipt of the status change message; and
   the second telephone having circuitry for modifying a status indicator in response to receipt of the signal from the second server, the status indicator operable for providing a sensory indication of the change of the first state to the second state in the first telephone.

2. The system as recited in claim 1, wherein the change in the first telephone from the first state to the second state is the first telephone ringing.

3. The system as recited in claim 1, wherein the status change message includes information identifying the first telephone and information identifying the second telephone.

4. The system as recited in claim 1, wherein the status indicator is visual.

5. The system as recited in claim 1, wherein the status indicator is auditory.

6. The system as recited in claim 1, wherein the status indicator can be sensed by touch.

7. A telephone system comprising:
   a first telephone connected to a first server in a first local area network ("LAN");
   a second telephone connected to a second server in a second LAN;
   a wide area network ("WAN") coupling the first LAN to the second LAN;
   the first server having circuitry for sending a status change message to the second server via the WAN, the status change message containing information that the first telephone has changed from a first state to a second state, wherein the first telephone is not off hook when it changes from the first state to the second state;
the second server having circuitry for sending a signal to the second telephone in response to receipt of the status change message; and
the second telephone having circuitry for modifying a status indicator in response to receipt of the signal from the second server, the status indicator operable for providing a sensory indication of the change of the first state to the second state in the first telephone.

8. A telephone system comprising:
a first telephone connected to a first server in a first local area network ("LAN");
a second telephone connected to a second server in a second LAN;
a wide area network ("WAN") coupling the first LAN to the second LAN;
the first server having circuitry for sending a status change message to the second server via the WAN, the status change message containing information that the first telephone has changed from a first state to a second state, wherein the change in the first telephone from the first state to the second state is the first telephone in a state of use by a user, wherein the change in the first telephone from the first state to the second state is the first telephone going off hook;
the second server having circuitry for sending a signal to the second telephone in response to receipt of the status change message; and
the second telephone having circuitry for modifying a status indicator in response to receipt of the signal from the second server, the status indicator operable for providing a sensory indication of the change of the first state to the second state in the first telephone.

9. A telephone system comprising:
a first telephone connected to a first server in a first local area network ("LAN");
a second telephone connected to a second server in a second LAN;
a wide area network ("WAN") coupling the first LAN to the second LAN;
the first server having circuitry for sending a status change message to the second server via the WAN, the status change message containing information that the first telephone has changed from a first state to a second state, wherein the change in the first telephone from the first state to the second state is the first telephone being placed in an on hold state;
the second server having circuitry for sending a signal to the second telephone in response to receipt of the status change message; and
the second telephone having circuitry for modifying a status indicator in response to receipt of the signal from the second server, the status indicator operable for providing a sensory indication of the change of the first state to the second state in the first telephone.

10. A telephone system comprising:
a first telephone connected to a first server in a first local area network ("LAN");
a second telephone connected to a second server in a second LAN;
a wide area network ("WAN") coupling the first LAN to the second LAN;
the first server having circuitry for sending a status change message to the second server via the WAN, the status change message containing information that the first telephone has changed from a first state to a second state, wherein the change in the first telephone from the first state to the second state is the first telephone being placed into a do not disturb state;
the second server having circuitry for sending a signal to the second telephone in response to receipt of the status change message; and
the second telephone having circuitry for modifying a status indicator in response to receipt of the signal from the second server, the status indicator operable for providing a sensory indication of the change of the first state to the second state in the first telephone.

11. A telephone system comprising:
a first telephone connected to a first server in a first local area network ("LAN");
a second telephone connected to a second server in a second LAN;
a wide area network ("WAN") coupling the first LAN to the second LAN;
the first server having circuitry for sending a status change message to the second server via the WAN, the status change message containing information that the first telephone has changed from a first state to a second state, wherein the change in the first telephone from the first state to the second state is a presence of a person in proximity to the first telephone;
the second server having circuitry for sending a signal to the second telephone in response to receipt of the status change message; and
the second telephone having circuitry for modifying a status indicator in response to receipt of the signal from the second server, the status indicator operable for providing a sensory indication of the change of the first state to the second state in the first telephone.

12. A telephone system comprising:
a first telephone connected to a first server in a first local area network ("LAN");
a second telephone connected to a second server in a second LAN;
a wide area network ("WAN") coupling the first LAN to the second LAN;
the first server having circuitry for sending a status change message to the second server via the WAN, the status change message containing information that the first telephone has changed from a first state to a second state;
the second server having circuitry for sending a signal to the second telephone in response to receipt of the status change message; and
the second telephone having circuitry for modifying a status indicator in response to receipt of the signal from the second server, the status indicator operable for providing a sensory indication of the change of the first state to the second state in the first telephone, wherein the status indicator can be sensed by smell.

13. A telephone system comprising:
a first telephone connected to a first server in a first local area network ("LAN");
a second telephone connected to a second server in a second LAN;
a wide area network ("WAN") coupling the first LAN to the second LAN;
the first server having circuitry for sending a status change message to the second server via the WAN, the status change message containing information that the first telephone has changed from a first state to a second state, wherein the change in the first telephone from the first state to the second state is the first telephone going on hook from an off hook state;

the second server having circuitry for sending a signal to the second telephone in response to receipt of the status change message;

the second telephone having circuitry for modifying a status indicator in response to receipt of the signal from the second server, the status indicator operable for providing a sensory indication of the change of the first state to the second state in the first telephone; and circuitry for setting up a voice communication between the first telephone and the second telephone in response to a user selecting the status indicator.

14. The system as recited in claim 13, wherein the status indicator is a key button having a light on the second telephone.

* * * * *

UNITED STATES PATENT AND TRADEMARK OFFICE
CERTIFICATE OF CORRECTION

PATENT NO. : 7,564,834 B1 Page 1 of 1
APPLICATION NO. : 10/283804
DATED : July 21, 2009
INVENTOR(S) : Eric G. Suder and Harold E. A. Hansen, II It is certified that error appears in the above-identified patent and that said Letters Patent is hereby corrected as shown below:

On the Title Page, Column 1 (Assignee), Delete "Estoch System," and insert
-- Estech Systems, --, therefor.

Signed and Sealed this

First Day of December, 2009

David J. Kappos
*Director of the United States Patent and Trademark Office*